(12) United States Patent
Brännström et al.

(10) Patent No.: US 12,195,021 B2
(45) Date of Patent: Jan. 14, 2025

(54) PLATFORM FOR PERCEPTION SYSTEM DEVELOPMENT FOR AUTOMATED DRIVING SYSTEM

(71) Applicant: ZENSEACT AB, Gothenburg (SE)

(72) Inventors: Mattias Brännström, Gothenburg (SE); Joakim Lin Sörstedt, Gothenburg (SE); Jonas Ekmark, Olofstorp (SE); Mats Nordlund, Mölndal (SE)

(73) Assignee: Zenseact AB, Gothenburg (SE)

( * ) Notice: Subject to any disclaimer, the term of this patent is extended or adjusted under 35 U.S.C. 154(b) by 232 days.

(21) Appl. No.: 17/836,305

(22) Filed: Jun. 9, 2022

(65) Prior Publication Data
US 2022/0396281 A1 Dec. 15, 2022

(30) Foreign Application Priority Data
Jun. 11, 2021 (EP) .................................... 21179123

(51) Int. Cl.
| | | |
|---|---|---|
| *B60W 50/06* | (2006.01) | |
| *B60W 50/00* | (2006.01) | |
| *B60W 60/00* | (2020.01) | |
| *G06V 10/778* | (2022.01) | |
| *G06V 10/80* | (2022.01) | |
| *G06V 20/56* | (2022.01) | |

(52) U.S. Cl.
CPC .......... *B60W 50/06* (2013.01); *B60W 60/001* (2020.02); *G06V 10/778* (2022.01); *G06V 10/809* (2022.01); *G06V 20/56* (2022.01); *B60W 2050/0014* (2013.01)

(58) Field of Classification Search
CPC ......... B60W 2050/0014; B60W 50/06; B60W 60/001; G01S 13/865; G01S 13/867; G01S 13/87; G01S 13/931; G01S 17/86; G01S 17/87; G01S 17/931; G01S 2013/9323; G01S 7/40; G01S 7/417; G01S 7/497; G06F 18/217; G06V 10/778; G06V 10/809; G06V 20/56

See application file for complete search history.

(56) References Cited

U.S. PATENT DOCUMENTS 9,760,806 B1 * 9/2017 Ning ...................... G06V 20/56
10,495,753 B2 * 12/2019 Melvin ................. B60W 30/09
(Continued)

FOREIGN PATENT DOCUMENTS

| WO | WO-2018052714 A2 * | 3/2018 | ............ B60Q 9/008 |
| WO | WO-2022258203 A1 * | 12/2022 | |

OTHER PUBLICATIONS

Extended European Search Report mailed Dec. 15, 2021 for European Application No. 21179123.1, 8 pages.

*Primary Examiner* — Babar Sarwar
(74) *Attorney, Agent, or Firm* — Sage Patent Group

(57) ABSTRACT

The present invention relates to methods and systems that utilize the production vehicles to develop new perception features related to new sensor hardware as well as new algorithms for existing sensors by using self-supervised continuous training. To achieve this the production vehicle's own perception output is fused with other sensors in order to generate a bird's eye view of the road scenario over time. The bird's eye view is synchronized with buffered sensor data that was recorded when the road scenario took place and subsequently used to train a new perception model to output the bird's eye view directly.

13 Claims, 5 Drawing Sheets

(56) References Cited

U.S. PATENT DOCUMENTS

| | | | |
|---|---|---|---|
| 10,937,186 B2* | 3/2021 | Wang | G06V 10/82 |
| 11,810,225 B2* | 11/2023 | Bagschik | G06F 30/27 |
| 11,858,514 B2* | 1/2024 | Bagschik | G06N 3/088 |
| 2014/0285667 A1* | 9/2014 | Aimura | G08G 1/166 |
| | | | 348/148 |
| 2016/0140424 A1* | 5/2016 | Wang | G06F 18/2414 |
| | | | 382/156 |
| 2016/0355181 A1* | 12/2016 | Morales Teraoka | ......... |
| | | | B60W 30/0956 |
| 2017/0154241 A1* | 6/2017 | Shambik | G06V 20/58 |
| 2017/0200063 A1* | 7/2017 | Nariyambut Murali | ...... |
| | | | G06V 10/454 |
| 2018/0081053 A1* | 3/2018 | Melvin | G01S 13/931 |
| 2018/0082137 A1* | 3/2018 | Melvin | G01S 7/417 |
| 2021/0394781 A1* | 12/2021 | Li | B60W 30/09 |
| 2022/0108213 A1* | 4/2022 | Cao | G06N 3/045 |
| 2023/0294736 A1* | 9/2023 | Lu | B60W 60/0016 |
| | | | 701/23 |

* cited by examiner

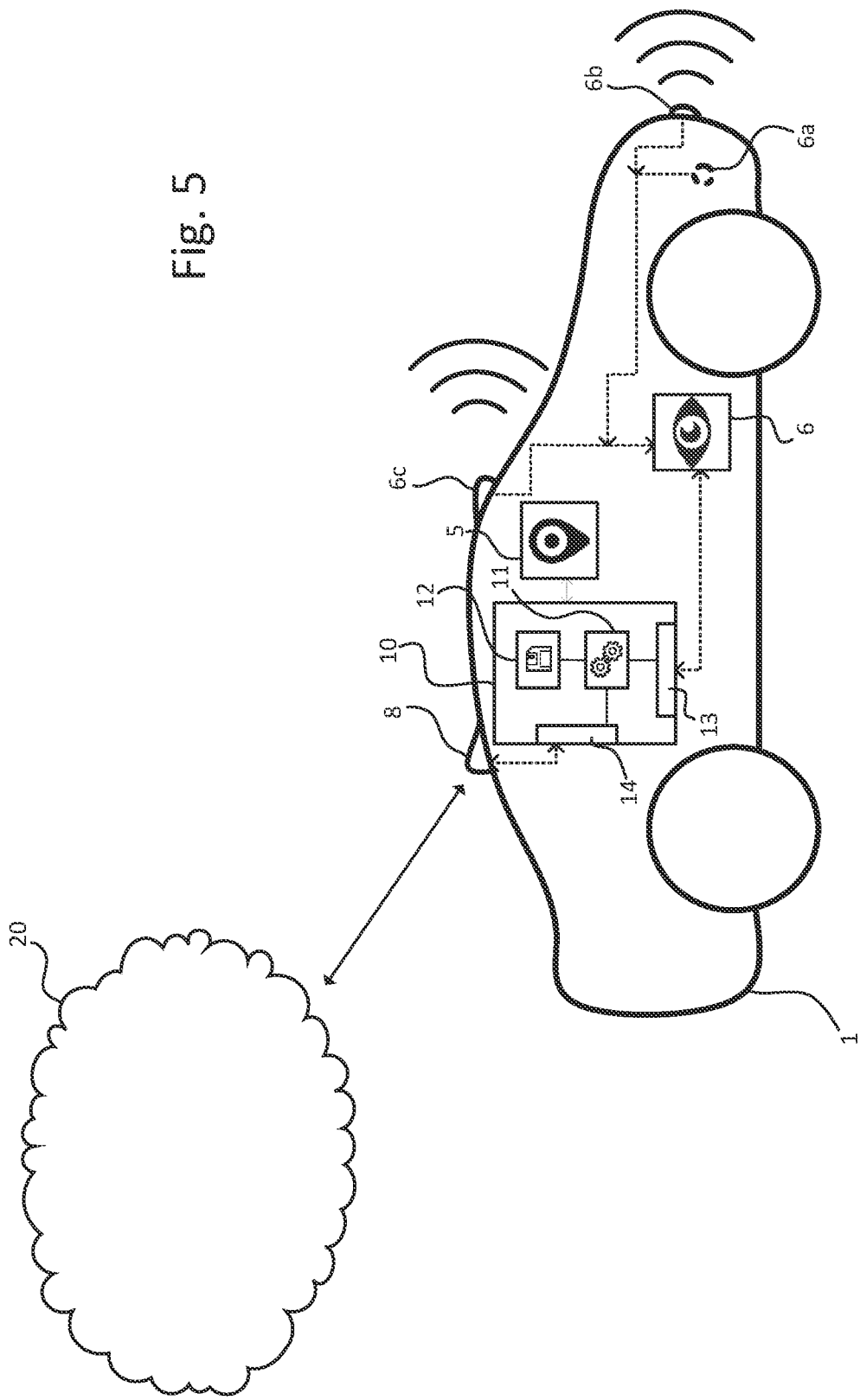

PLATFORM FOR PERCEPTION SYSTEM DEVELOPMENT FOR AUTOMATED DRIVING SYSTEM

CROSS-REFERENCE TO RELATED APPLICATIONS

The present application for patent claims priority to European Patent Office Application Ser. No. 21179123.1, entitled "PLATFORM FOR PERCEPTION SYSTEM DEVELOPMENT FOR AUTOMATED DRIVING SYSTEM" filed on Jun. 11, 2021, assigned to the assignee hereof, and expressly incorporated herein by reference.

TECHNICAL FIELD

The present invention generally relates to training of perception features in autonomous and semi-autonomous vehicles. In particular, the present invention relates to a method and a system for self-supervised continuous training of a perception-development module of a vehicle equipped with an Automated Driving System (ADS).

BACKGROUND

During the last few years, the research and development activities related to autonomous vehicles have exploded in number and many different approaches are being explored. An increasing portion of modern vehicles have advanced driver-assistance systems (ADAS) to increase vehicle safety and more generally road safety. ADAS—which for instance may be represented by adaptive cruise control, ACC, collision avoidance system, forward collision warning, etc.—are electronic systems that may aid a vehicle driver while driving. Today, there is ongoing research and development within a number of technical areas associated to both the ADAS and Autonomous Driving (AD) field. ADAS and AD will herein be referred to under the common term Automated Driving System (ADS) corresponding to all of the different levels of automation as for example defined by the SAE J3016 levels (0-5) of driving automation, and in particular for level 4 and 5.

In a not too distant future, ADS solutions are expected to have found their way into a majority of the new cars being put on the market. An ADS may be construed as a complex combination of various components that can be defined as systems where perception, decision making, and operation of the vehicle are performed by electronics and machinery instead of a human driver, and as introduction of automation into road traffic. This includes handling of the vehicle, destination, as well as awareness of surroundings. While the automated system has control over the vehicle, it allows the human operator to leave all or at least some responsibilities to the system. An ADS commonly combines a variety of sensors to perceive the vehicle's surroundings, such as e.g. radar, LIDAR, sonar, camera, navigation system e.g. GPS, odometer and/or inertial measurement units (IMUs), upon which advanced control systems may interpret sensory information to identify appropriate navigation paths, as well as obstacles, free-space areas, and/or relevant signage.

Deep Learning (DL) is a promising technology in the area of perception, for example in order to detect and classify objects in images, video streams and/or LIDAR point clouds. However, the problem with DL is that it quickly reaches some level of performance, but then extremely large amounts of data are required to get truly high performance Annotating millions of images is expensive, and hence many initiatives are taken in the autonomous driving field to reduce this cost through semi-automated annotation and learning efficiently from the annotated data. However, even with these advances it is still a very costly process. Moreover, uploading images and data from production vehicles for annotation and training is simply not efficient, adds cost, and does not scale well when the number of vehicles in the production-vehicle fleet reaches thousands or millions of vehicles in hundreds of markets.

There is accordingly a need in the art for new solutions for facilitating development and verification of ADSs in order to continuously be able to provide safer and higher performing systems. As always, the improvements shall preferably be made without significant negative impact on the size, power consumption and cost of the on-board system or platform.

SUMMARY

It is therefore an object of the present invention to provide a method performed by a computing system for self-supervised continuous learning of a perception-development module of a vehicle, a computer-readable storage medium, a system, and a vehicle comprising such a system, which alleviate all or at least some of the above-discussed drawbacks of presently known systems and methods.

This object is achieved by means of a method performed by a computing system for self-supervised continuous learning of a perception-development module of a vehicle, a computer-readable storage medium, a system, and a vehicle as defined in the appended claims. The term exemplary is in the present context to be understood as serving as an instance, example or illustration.

According to a first aspect of the present invention, there is provided a method performed by a computing system for self-supervised continuous training of a perception-development module of a vehicle. The method comprises storing, during a time period, a first set of sensor data obtained from a first set of vehicle-mounted sensors, where the first set of sensor data is indicative of a surrounding environment of the vehicle. The method further comprises obtaining a first set of perception data from a trained machine-learning perception module configured to generate a perception output based on sensor data. The first set of perception data is based on the first set of sensor data and furthermore indicative of at least one perceptive parameter in the surrounding environment of the vehicle during the time period. Furthermore the method comprises forming training data based on a second set of perception data obtained from a perception fusion module configured to generate a perception output based on a fusion of the first set of perception data and a supplementary set of data. The supplementary set of data is indicative of a surrounding environment of the vehicle and a state of the vehicle during the time period, and the second set of perception data comprises a bird's eye view of a surrounding environment of the vehicle of at least one moment in time during the time period. The method further comprises synchronizing the training data with the stored first set of sensor data, and updating one or more parameters of a perception model of the perception-development module based on at least a portion of the synchronized training data and a corresponding portion of the stored first set of sensor data. The perception-development module is accordingly configured to generate a bird's eye view of a surrounding environment of the vehicle based on the perception model and sensor data obtained from the first set of vehicle-mounted sensors.

According to a second aspect of the present invention, there is provided a (non-transitory) computer-readable storage medium storing one or more programs configured to be executed by one or more processors of an processing system (e.g. in-vehicle processing system), the one or more programs comprising instructions for performing the method according to any one of the embodiments disclosed herein. With this aspect of the invention, similar advantages and preferred features are present as in the previously discussed first aspect of the invention.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

In accordance with a third aspect of the present invention there is provided a system for self-supervised continuous training of a perception-development module of a vehicle. The system comprises control circuitry configured to store, during a time period, a first set of sensor data obtained from a first set of vehicle-mounted sensors. The first set of sensor data is accordingly indicative of at least a portion of the surrounding environment of the vehicle. Further, the control circuitry is configured to obtain a first set of perception data from a trained first machine-learning perception module configured to generate a perception output based on sensor data. The first set of perception data is based on the first set of sensor data and furthermore indicative of at least one perceptive parameter in at least a portion of the surrounding environment of the vehicle during the time period. Furthermore, the control circuitry is configured to form training data based on a second set of perception data obtained from a perception fusion module that is configured to generate a perception output based on a fusion of the first set of perception data and a supplementary set of data. The supplementary set of data is indicative of a surrounding environment of the vehicle and/or a state of the vehicle during the time period. The supplementary set of data may for example be output from an IMU of the vehicle, map data, GNSS data, or other sensor data. The second set of perception data comprises a bird's eye view of a surrounding environment of the vehicle of at least one moment in time during the time period. The control circuitry is further configured to synchronize the training data with the stored first set of sensor data, and to update one or more parameters of a perception model of the perception-development module based on at least a portion of the synchronized training data and a corresponding portion of the stored first set of sensor data. The perception-development module being configured to generate a bird's eye view of a surrounding environment of the vehicle based on the perception model and sensor data obtained from the first set of vehicle-mounted sensors.

According to a fourth aspect of the present invention, there is provided a vehicle comprising a set of vehicle-mounted sensors configured to monitor a surrounding environment of the vehicle. The vehicle further comprises a trained first machine-learning perception module configured to generate a perception output based on sensor data, and an automated driving system (ADS) having a perception module configured to generate a first set of perception data based on sensor data obtained from one or more of the set of vehicle-mounted sensors. The ADS has a perception module configured to generate a perception output based on a fusion of the first set of perception data and a supplementary set of data, wherein the supplementary set of data is indicative of a surrounding environment of the vehicle and/or a state of the vehicle. The vehicle further comprises a system for self-supervised continuous learning of a perception-development module of the vehicle according to any one of the embodiments disclosed herein. With this aspect of the invention, similar advantages and preferred features are present as in the previously discussed first aspect of the invention.

The herein proposed methods, computer-readable storage media, systems, and vehicles accordingly provide a learning platform that utilizes the production system and sensors of the ADS in order to carry out a training process for new software and hardware versions of various perception features for use in autonomous driving applications. Some of the advantages of the present invention include:

- Cost effective and time efficient development of perception features for autonomous driving applications.
- Efficient utilization of available production resources in the production vehicles to facilitate the development of new perception features.
- The training/learning can be fully executed within the vehicle thereby providing advantages in terms of data security and data privacy.
- The local training/learning enables for development of models that are tailored for specific markets or operational design domains (ODDs).
- The "bird's eye view" perception output provides a natural input format for perception models to work with, enabling high quality output and efficient computation.
- The perception models can be trained not only for "classical perception" but also for motion prediction and road user interaction models, thereby providing advantages in terms of versatility.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF THE DRAWINGS

Further objects, features and advantages of embodiments of the invention will appear from the following detailed description, reference being made to the accompanying drawings, in which:

FIG. 5 is a schematic side-view of a vehicle comprising a system for self-supervised continuous learning of a perception-development module of a vehicle in accordance with an embodiment of the present invention.

DETAILED DESCRIPTION

Figure 1:
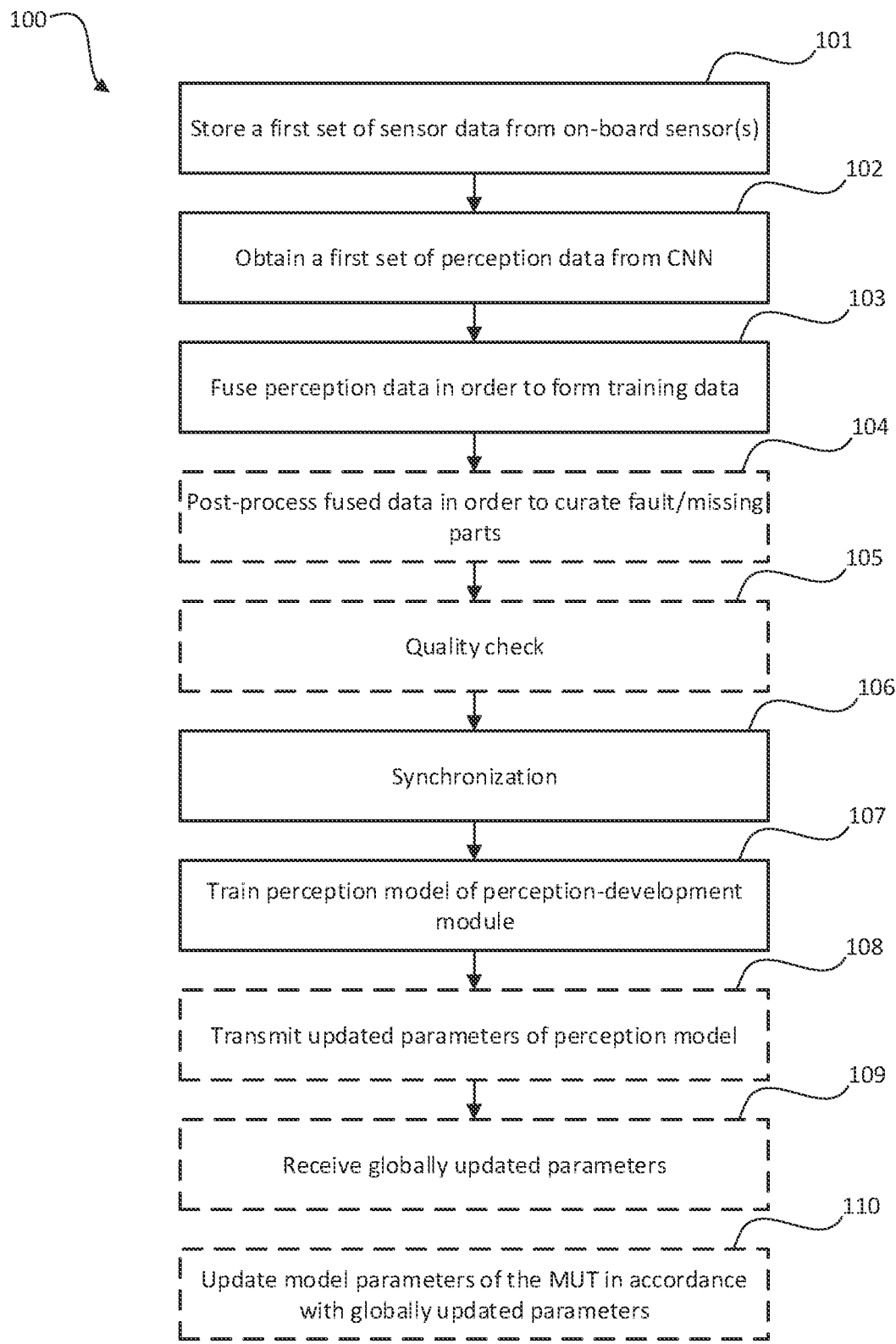
FIG. 1 is a schematic flow chart representation of a method performed by a computing system for self-supervised continuous learning of a perception-development module of a vehicle in accordance with an embodiment of the present invention.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present invention is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

The invention as disclosed herein provides methods and systems that enable continuous learning in all vehicles, fully self-supervised. The teachings herein can be used not only for developing/training/learning, testing and verifying, perception modules/features in the form of detection and classification of objects, but also in the form of road user intention prediction and road user interaction models. Moreover, they can be applied for training algorithms both in single vehicles, in a mesh (swarm) learning approach and for offline learning with stored (pre-recorded) data. The training can also be focused to obtain extreme performance in targeted operational design domains, specific roads, or weather conditions in different regions of the world.

In short, the invention relates to an aspect of having an "original model" (trained machine learning perception model) configured to detect and classify objects, road-like surfaces, light conditions, and weather conditions from images or LIDAR data using a limited amount of training data, focusing detections and classification of objects in close proximity to the vehicle. Typically, this model is trained by using manually annotated data in the image plane. Next, the output from this model is used as input to a perception block that fuses information from several sources of information over time, where this trained model provides one of the sources of information. The output from the (fusing) perception block is a bird's eye view of the road scene.

Subsequently, the bird's eye view output may be post-processed to curate missing/faulty parts and to perform a quality/consistency check to determine if the bird's eye view is sufficiently accurate/reliable or not. The data curation may be understood as a step of putting data in an "optimized format", and may for example involve formatting, labeling (annotating), cleansing, and feature extraction.

If the data is determined to be sufficiently accurate to be useful for training a new perception model, the data is put in a "container". Then, the quality checked and post-processed bird's eye view data is synchronized with previous images and/or LIDAR data recorded at the time when the post-processed bird's eye view took place. Next, the time-synchronized bird's eye view and the images and/or LIDAR data are employed to train a "new model" to output the bird's eye view directly from an input in the form of images and/or LIDAR data. Since the bird's eye view (used for training) is quality checked and therefore considered to be of high quality, the output from the new model will consequently be of equivalent quality when it is exposed to this form of training over a sufficiently long period of time and by multiple vehicles.

Furthermore, when applying distributed learning (e.g. swarm learning, federated learning, etc.), a joint "new model" can advantageously first be trained offline or in a single vehicle, before it is deployed in many vehicles and updated centrally by merging updates in the "new model" learned locally in each vehicle. Thus, the "new model" will have a joint base for all vehicles to learn from; otherwise, it may be challenging to merge the learnings from several vehicles.

Further, the "original model" (i.e. the perception model generating an output in the image plane) can be replaced with the new model (i.e. the perception model generating an output in a bird's eye view) once the new model outperforms the original model. Accordingly, there is provided a cost and resource efficient method for self-supervised continuous learning that can be fully automated and built upon existing hardware platforms. Specifically, having a centralized compute platform can be advantageous, as training of the new model might consume more memory and/or computational capacity than executing either the original model or the new model. With a centralized compute platform, the new model can be trained using existing in-vehicle hardware e.g., when the vehicle is stationary in a traffic jam or when it is parked, thus utilizing the full capacity of the hardware.

As an example, the training a the bird eye view neutral network (NN) can be performed using a federated learning scheme, in which a joint pre-trained "bird's eye view NN" deployed in multiple vehicles, after which, each vehicle makes "small" local updates in the weights of the NN. These updates are then uploaded/transmitted to a central location for merging in order to form a new joint NN. The merging may for example be performed by applying e.g. the sum or the average updates, possibly weighted based on how much data or another measure of the amount of interesting data that was collected by each individual vehicle since the last update. If training examples of challenging scenarios or conditions have been generated in simulations or at a test track, the updates from such "training sessions" may also be merged with the updates made by individual vehicles. As an additional quality and safety check, the updated NN may be tested on a validation data set and/or deployed and evaluated in the background (i.e. shadow mode testing) of one or several vehicles before the new joint "bird's eye view NN" is deployed/pushed broadly to all vehicles in a fleet.

FIG. 1 is a schematic flow chart representation of a method 100 suitable to be performed by a computing system for self-supervised continuous learning of a perception-development module of a vehicle. The method 100 may be performed by an in-vehicle computing system, an off-board computing system, or a combination thereof. In other words, the self-supervised learning regime as taught herein can be performed online (i.e. in the vehicle) as a distributed learning scheme (e.g., swarm learning, federated learning, etc.), or offline (i.e. in a "back-office" solution). However, a portion (e.g., a majority) of the training of the algorithms is preferably performed on the edge (i.e., in the vehicle) and subsequently consolidated either on the edge on centrally (i.e. in the "back-office" or "cloud") as the data (i.e. model parameters) transmitted between the vehicles in the fleet and the back-office, data transfer will mainly be in the form of network weights thereby alleviating problems existing with current practice of transferring data, which has high bandwidth requirements, as well as concerns related to data security and privacy.

The term "perception-development module" may be understood as "Module Under Test" (MUT), meaning that is a "new" (under development) software and/or hardware perception feature. In the present context, the perception-development module is a module configured to generate a bird's eye view of a surrounding environment of the vehicle based on the perception model and sensor data obtained from a first set of vehicle-mounted sensors. The first set of vehicle-mounted sensors preferably comprises one or more vehicle-mounted cameras/image sensors and/or one or more Light Detection and Ranging (LIDAR) devices.

In some embodiments, the "perception-development module" is software and/or hardware configured to generate a perception output based on input from the first set of vehicle-mounted sensors, where the module is currently "under development", and not yet "in production" (e.g. not verified/validated). However, in other embodiments, the perception-development module is "in production" and the concepts as disclosed herein may be used to improve the performance of the perception-development module by increasing the accuracy of the output or by extending the "coverage" to new Operational Design Domains (ODDs).

Moving on, the method 100 comprises storing 101, during a time period, a first set of sensor data obtained from a first set of vehicle-mounted sensors. The first set of sensor data is indicative of a surrounding environment of the vehicle. Thus, the first sensor data may be data obtained from one or more RADARs, one or more LIDARs, one or more cameras, or any other suitable vehicle-mounted sensor as known in the art. However, in some embodiments the first set of sensor data comprises only image data (i.e. output obtained from one or more vehicle-mounted cameras).

The first set of sensor data may for example be stored 101 or saved in a data buffer (not shown), where this first set of sensor data may be understood as data indicative of the vehicle's surroundings. The first set of sensor data may be raw sensor data or processed sensor data, derived continuously and/or intermittently from a first time point T1 to a second time point T2. The time period—and correspondingly the length of the optional data buffer—may be of any arbitrary size deemed feasible, e.g. in consideration of data capacity restraints and/or characteristics of the ADS, and may for instance range from under a second up to several minutes, or more preferred, from a few seconds up to less than a minute.

Further, the method 100 comprises obtaining 102 a first set of perception data from a trained machine-learning perception module configured to generate a perception output based on sensor data. More specifically, the obtained 102 first set of perception data is generated based on the first set of sensor data and the first set of perception data is indicative of at least one perceptive parameter in the surrounding environment of the vehicle during the (same) time period. In other words, the data generated by the first set of vehicle-mounted sensors during the aforementioned time period is stored in a suitable data storage medium (e.g. data buffer) while the "same" sensor data (i.e. a corresponding copy of that sensor data) is used to generate the first set of perception data. In other words, the first set of sensor data is simultaneously provided to a suitable data storage medium and to the trained machine-learning perception module.

Furthermore, the trained machine-learning perception module may be in the form of an artificial neural network such as e.g. a Convolutional Neural Network (CNN). Moreover, the term "perception data" should in the present context be interpreted broadly and includes both classic "perception" (e.g. object detection/classification, lane tracking, object tracking) as well as "predictions" of future states or trajectories of external objects. Thus, the term "perceptive parameter" is to be understood as a term encompassing various objectives such as estimations of e.g. one or more of object positions, object classifications, lane markings, object trajectory predictions, free-space estimations, etc. Free-space estimations may be understood as a determination of free-space areas i.e. estimates of areas absent of external objects (static and dynamic objects). One can consider an estimation of "drivable area" in an analogous fashion, where in addition to the estimation of areas absent of objects (as in the case of free space) the "drivable area" estimation also includes the presence of a road surface.

The method 100 further comprises forming 103 training data based on a second set of perception data obtained from a perception fusion module configured to generate a perception output based on a fusion of the first set of perception data and a supplementary set of data. In more detail, the supplementary set of data is indicative of a surrounding environment of the vehicle and a state of the vehicle during the time period. In other words, the supplementary set of data may be understood as data indicative of the surroundings of the vehicle that originates from different sources than the first set of vehicle-mounted sensors. For example, the stored 101 first set of sensor data may be in the form of images obtained from one or more vehicle-mounted cameras or output from one or more vehicle-mounted LIDAR devices. The supplementary set of data may for example be output from an inertial measurement unit (IMU) of the vehicle, map data (e.g. HD-map data), GNSS data, output from one or more radar devices, and so forth.

Thus, the step of forming 103 training data may comprise obtaining the supplementary set of data and fusing the first set of perception data and the supplementary set of data so to form the second set of perception data that is used to form the "training data". It should be noted that the label "training data" is predominantly used in the present context as a label to increase the intelligibility of the present disclosure, and should not necessarily be construed as limiting the scope of the invention. The "training data" may also be construed as a "desired output" forming a part of an entire "training set", where the other part is the "input" or "input object".

Furthermore, the second set of perception data (i.e. the output from the fusion module) comprises a bird's eye view of the surrounding environment of the vehicle of at least one moment in time during the time period. Thus, the bird's eye view of the surrounding environment may be in the form of a snapshot or a single frame (i.e. a momentary point in time) within the "time period", a sub-set of consecutive snapshots/frames (i.e. a sub-set of momentary time points) comprised within the "time period", or a full scenario development ranging from the starting point to the end point of the "time period".

The term "bird's eye view" may be understood as an elevated view of the ego-vehicle and its surrounding environment that may be in the form of a perspective/isometric view in 3D or a top-view in 2D or 3D of the ego-vehicle and its surrounding environment. Preferably the "bird's eye view" is defined in a Cartesian coordinate system, although, the skilled reader readily understands that any suitable coordinate system that is applicable in a topological space such as a Euclidean space may be used. Thus, a "bird's eye view" may in some embodiments be referred to as a Cartesian two-dimensional (2D) or three-dimensional (3D) view.

Further, the method 100 may comprise an optional step of post-processing 104 the second set of perception data (i.e. the output from the perception fusion module) in order to curate the second set of perception data. The data curation may be understood as a process of selecting and managing the data to meet the needs an intended application for the data (here for machine learning purposes). Thus, in some embodiments, the post-processing 104 of the second set of perception data comprises curating the second set of perception data so to curate missing or faulty parts of the second set of perception data. The post-processing 104 is further elucidated and exemplified with reference to FIG. 2.

Moving on, the method 100 may further comprise an optional step of performing 105 a quality check on the second set of perception data or the post-processed 104 second set of perception data. In more detail, the second set of perception data (inherently) comprises a confidence/uncertainty estimation of a plurality of perceptive parameters (e.g. object classes, object positions/bounding boxes, road edge estimations, road geometry estimations, etc.) comprised in the bird's eye view of a surrounding environment of the vehicle of at least one moment in time during the time period. These uncertainty estimations may either be provided directly from the sensor devices prior to the fusion process, or as part of the fusion process as known in the art. Thus, the quality check 105 aims to differentiate between "high-quality" data from low to mid-quality data/uncertain data/inaccurate data. This differentiation may for example be based on a predefined confidence threshold of e.g. 70%, such that perceptive parameters associated with a confidence estimate above 70% are considered to be "high quality" while perceptive parameters associated with a confidence estimate below 70% are considered to be "low-mid quality".

The confidence threshold may be set to any suitable level, e.g. in the range of 50%-100%, depending on specific applications or level of maturity of the model (e.g. artificial neural network) that is being trained. In more detail, for the initial stages of training a lower confidence threshold may be suitable in order to generate more training data, while as the model matures higher thresholds may be more suitable. Thus, the confidence threshold may be a dynamic threshold set in dependence of the level of maturity of the perception model of the perception development module.

Further, the method 100 comprises synchronizing 106 the formed 103 training data with the stored first set of sensor data. The synchronizing 106 may be understood as an alignment procedure such that sensor data and training data of corresponding time stamps are aligned/paired. In other words, a "time shift" may be applied the training data and/or the stored first set of sensor data such that the data is aligned in time.

Moreover, in some embodiments, the synchronization 106 of the training data with the stored first set of sensor data is only performed for training data having a confidence estimation above a threshold. In other words, preferably, only the training data "passing" the quality check 105 is synchronized with the stored sensor data. Accordingly, the training data that "fails" the quality check 105 may be sent to a remote entity for manual annotation, off-board processing, or the like. In other words, the method may further comprise transmitting the formed training data and the stored sensor data to a remote entity if the training data has a confidence estimation below the threshold. This may be advantageous in order to identify so-called "corner cases" (i.e. rare scenarios/events) in the surrounding environment of the vehicle.

For example, if the vehicle's perception algorithms are not capable of correctly classifying a certain object (e.g. a plastic bag caught in an updraft, a specific wild animal next to the road, or the like) then that "object" will be associated with a low confidence classification. Thus, the "training data" or the "second set of perception data" that contain observations of this "uncertain" object may be sent to the "back-office" for manual annotation so that future perception algorithms can be trained to accurately classify that object in future versions of the software.

The method 100 further comprises updating 107 one or more parameters of a perception model of the perception-development module based on at least a portion of the training data and a corresponding portion of the stored first set of sensor data. The perception-development module is as mentioned configured to generate a bird's eye view of a surrounding environment of the vehicle based on the perception model and sensor data obtained from the first set of vehicle-mounted sensors. The perception model of the perception-development module may accordingly be labeled as a "Bird's eye view CNN".

In some embodiments, a supervised learning algorithm is employed to update 107 the one or more parameters of the perception-development module. In more detail, the step of updating 107 may comprise updating one or more parameters of the perception model of the perception-development module by means of a learning algorithm based on at least a portion of the stored first set of sensor data and by using a corresponding portion of the synchronized training data as a supervisory signal. Thus, the stored sensor data 101 and the synchronized training data form a set of training examples, where each example is a pair (e.g. a pair of frames), and the stored sensor data 101 forms an input object and the training data forms the desired output value.

Further, the method 100 may include a federated learning scheme, where the method 100 further comprises transmitting 108 the one or more updated parameters of the perception model of the perception-development module to a remote entity (e.g. back-office/fleet management system/etc.). Then, a set of globally updated parameters of the perception model of the perception-development module may be received 109. The set of "globally updated" parameters are to be understood as parameters that have been updated based on information obtained from a plurality of vehicles comprising the perception-development module. The one or more model parameters of the perception model of the perception-development module are then updated 110 based on the received set of globally updated parameters.

Still further, the self-supervised continuous training method of a perception-development module of a vehicle as disclosed herein can be used in two "stages". In more detail, in a first stage, it is assumed that a trained perception model configured to detect and classify objects from images (i.e. camera output) and/or LIDAR data. Such perception models are conventionally available, and generally focus on detections and classification of objects in close proximity to the vehicle. Typically, this "conventional" perception model is trained using manual annotations in the image plane. In the following such a trained perception model may be referred to as an "image plane CNN".

In accordance with an embodiment of the present invention, this image plane CNN is used as input to a perception block of the vehicle that fuses information from several sources of information over time, where the image plane CNN provides one of the sources of information. Accordingly, the output from the "perception block" is a bird's eye view of the road scene (i.e. surrounding environment of the vehicle).

Accordingly, in some embodiments, the trained machine-learning perception module is configured to generate a perception output in an image plane comprising detections and classifications of objects based on sensor data obtained from the first set of vehicle-mounted sensors. Accordingly, the obtained first set of perception data may be output in reference to an image plane.

However, in a second "stage", the "image plane CNN" is replaced with the "perception-development module" once it outperforms the "image plane CNN". Thus, in some embodiments, the trained machine-learning perception module is the perception-development module that is configured to generate a bird's eye view of a surrounding environment of the vehicle based on sensor data obtained from the first set of vehicle-mounted sensors. The "perception-development module" may in the following be referred to as a "bird's eye view CNN". Accordingly, the output from "bird's eye view CNN" will serve as an input to the perception block of the vehicle that fuses information from several sources of information over time. The "bird's eye view CNN" will then be continuously updated in accordance with the process described in the foregoing. These two "stages" are further illustrated and describe in reference to FIGS. 2 and 3 respectively.

Figure 2:
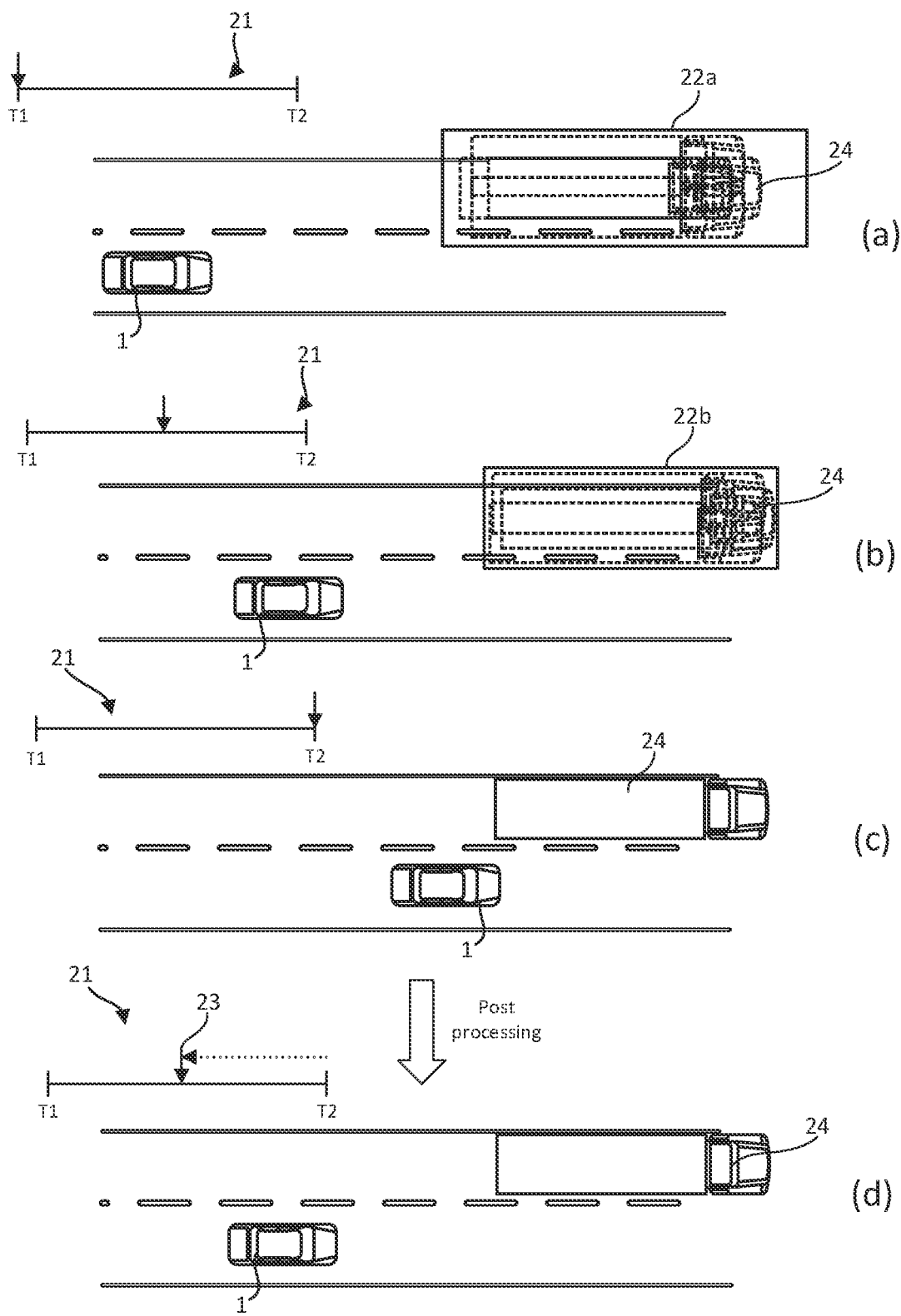
FIG. 2 is a schematic top-view illustration of a post-processing method in accordance with an embodiment of the invention in the form of a series of scenes depicting a temporal development of vehicle approaching an object.

The post-processing step 102 will now be further exemplified in reference to FIG. 2, which depicts a series (a)-(d) of schematic top-view illustrations of a vehicle 1 moving a road portion towards an external object 24. Each illustration is associated with a point in time within the time period 21 ranging from a first moment in time T1 to a second moment in time T2.

In the first illustration (a) the vehicle 1 (may also be referred to as ego-vehicle 1) is moving towards an external object, here in the form of a truck 24, that is traveling in the same direction on an adjacent lane on the road portion. However, due to the distance to the truck 24, the vehicle's perception system/module may not be able to determine, with a sufficiently high level of accuracy, the position of the external object, and to classify it as a truck. This is indicated by the box 22a enclosing the truck 24 and the "blurred" representation of the truck 24, which serve to schematically indicate the "uncertainties" of the detection and classification.

At a subsequent moment in time, i.e. illustration (b) of FIG. 2, the vehicle 1 is closer to the external object, and the uncertainties regarding the external object's 24 position and class/type are reduced, as indicated by the reduced size of the box 22b and the converging "blur" as compared to the situation in illustration (a).

At yet another subsequent moment in time, i.e. illustration (c) of FIG. 2, the vehicle's 1 perception system/module is able to accurately determine the external object's 2 position and classify it as a truck 2. More specifically, the ego-vehicle 1 is now sufficiently close to the truck 2 to be able to classify it and estimate the truck's position on the road with a higher level of accuracy as compared to when the ego-vehicle 1 was located further away from the truck.

Then, by means of a suitable filtering technique and based on the temporal development of the "scenario", one is able to establish a "worldview" at an intermediate point 23 in time between T1 and T2, as indicated in the bottom illustration in FIG. 2, i.e. in illustration (d) of FIG. 2. In more detail, the filtering may for example be based on the temporal development of the trajectories, positions, etc. in combination with predefined models (e.g. motion models) of the vehicle 1 and external objects 2. This established worldview may subsequently be used as a "ground truth" for training and/or validation of various perception output, and in particular for training and/or validation of the output obtained from the perception-development module. Thus, in some embodiments, the world.

In accordance with some embodiments, the time period ranges from a first time point to a second time point, and the method further comprises storing, during the time period, the second set of perception data. Accordingly, the step of post-processing the second set of perception data may comprise determining, based on post-processing a portion of the second set of perception data ranging back from the second time point to an intermediate time point between the first time point T1 and second time point T2 the training data indicative of a bird's eye view of the surrounding environment of the vehicle. The post-processed training data is accordingly conditional on the portion of the second set of perception data. Moreover, in accordance with some embodiments, the post-processing of the portion of the second set of perception data comprises running the portion of the second set of perception data through a backwards filter. Here, the backwards filter is configured to align a set of perceptive parameters of the second set of perception data at the intermediate time point based on a development of the state(s) of the set of perceptive parameters from the intermediate time point to the second time point T2.

In other words, with the increased knowledge of vehicle 1 surroundings as time passes from the intermediate time point 23 to the second time point T2 and by analyzing data in reverse temporal direction, one may be able to determine, with a higher level of accuracy, the "state" (i.e. classes, positions, trajectories, etc.) of the objects in the vehicle's 1 surroundings at the intermediate time point, than it was able to do at "run-time". In more detail, the post processing may for example comprise running the first set of perception data through a backwards filter configured to align e.g. the objects current and predicted future states with what happened in the future—i.e. from the intermediate time point to the second time point T2. The post-processing may include further processing steps than running it through a backwards filter. More specifically, the post-processing may include fusion of data from various sensors, as well as applying backward and forward filtering on the fused information. Suitable filters for this purpose may for example be Particle filters or different types of Kalman filters (e.g. extended Kalman filters).

Executable instructions for performing these functions are, optionally, included in a non-transitory computer-readable storage medium or other computer program product configured for execution by one or more processors.

Figure 3:
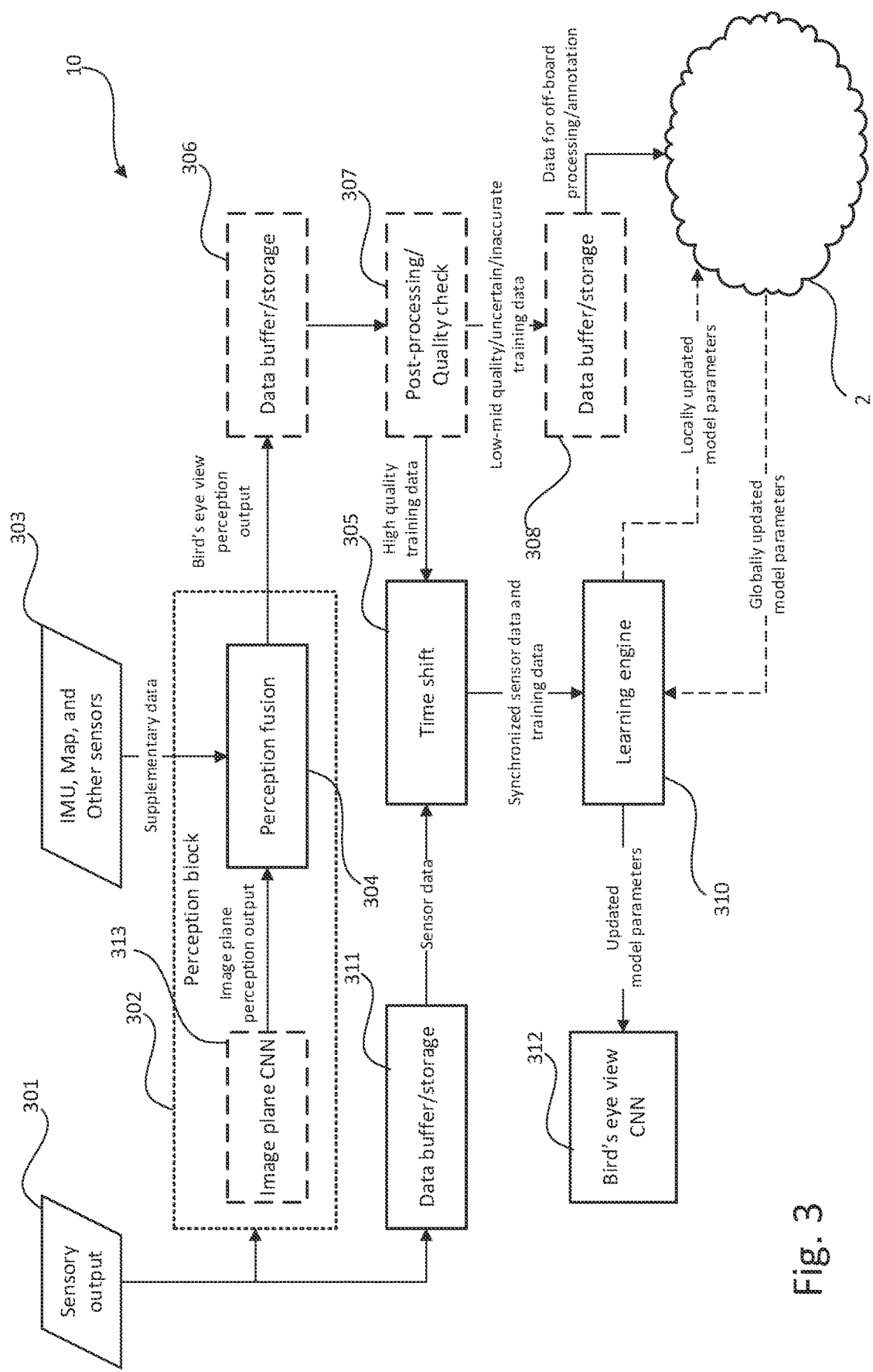
FIG. 3 is a schematic block diagram representation of a system for self-supervised continuous learning of a perception-development module of a vehicle in accordance with an embodiment of the present invention.

FIG. 3 is a schematic block diagram representation of a system for self-supervised continuous learning of a perception-development module of a vehicle in accordance with an embodiment of the present invention. In general, FIG. 3 depicts the flow of information through exposure to an event in the vehicle to the transmission and subsequent consolidation in the "back-office" 2. The system 10 comprises control circuitry configured to perform the functions of the methods disclosed herein, where the functions may be included in a non-transitory computer-readable storage medium or other computer program product configured for execution by the control circuitry. However, in order to better elucidate the present invention, the control circuitry is represented as various "modules" in FIG. 3, each of them linked to one or more specific functions. As mentioned in the foregoing, FIG. 3 depicts an aspect of the invention referred to as a "first stage", where a trained "image plane CNN" 313 is used to train the "bird's eye view CNN" (i.e. the perception-development module) 312.

It should be noted that the "image plane perception output" that is fused in the "sensor fusion module" 304 could be any type of perception output e.g. objects, their states, free-space (the absence of objects), lanes, road position, drivable area, and combinations thereof. However, the focus of the illustrated embodiment will be on object detections and classifications.

The system 10 comprises control circuitry configured to store, during a time period, a first set of sensor data 301 obtained from a first set of vehicle-mounted sensors. The first set of sensor data 301 is indicative of a surrounding environment of the vehicle. The first set of sensor data 301 is preferably in the form of an output from one or more LIDAR devices or one or more cameras (monocular and/or stereo cameras). However, sensory output from other types of sensors may also be comprised in the first set of sensor data, such as e.g. output from one or more RADAR devices, one or more ultrasonic sensors, etc. The first set of sensor is preferably stored in a suitably sized data buffer 311.

Further, the first set of sensor data 301 is fed in parallel to the data buffer 311 and to a perception block 302 comprising the "image plane CNN" 313 that is configured to generate a perception output in an image plane comprising detections and classifications of objects based on sensor data 301 obtained from the first set of vehicle-mounted sensors. The trained first machine-learning perception module/model is accordingly provided in the form of an "image plane CNN" 313 in FIG. 3.

Further, a perception fusion module 304 is configured to generate a perception output based on a fusion of the first set of perception data and a supplementary set of data 303. The perception output from the perception fusion 304 module is "training data" in the form of a bird's eye view of the surrounding environment of the vehicle of at least one moment in time during the period (i.e. of at least one "frame" or "scene" during the time period). The supplementary set of data may for example be map data or output from an IMU or any other vehicle-mounted sensors. Thus, the supplementary set of data is indicative of a surrounding environment of the vehicle and/or a state of the vehicle during the time period.

Still further, in a subsequent step, the training data (i.e. the bird's eye view perception output) may be post-processed in order to curate missing or faulty parts of the "worldview" (i.e. perception output) and quality or consistency check may be performed to determine the level of accuracy or confidence of the various perceptive parameters forming the "worldview". The post-processing and quality check may be performed by a separate evaluation engine or module 307 as indicated in FIG. 3. Moreover, in some embodiments, the bird's eye perception output provided by the perception fusion module 304 may be stored in an intermediate data storage/buffer 306 before the post-processing/quality check.

Then, the post-processed and quality checked training data and the stored/buffered first sensor data are fed to a synchronization module 305 that synchronizes the training data with the sensor data that was recorded at the time when the bird's eye view perception output took place. For example, the training data may comprise a quality checked bird's eye view of the surroundings of the ego vehicle a few seconds ago, and the sensor data may comprise camera and/or LIDAR data recorded at that time instance. Since the training data has been curated and refined using "future" information, it can be used as a base for self-supervised learning, in analogy to when humans learn to identify animals/objects by moving closer to them and then use the full experience to identify similar objects at further and further distances in various weather conditions over time by recalling their earlier experiences. Moreover, the time shift enables learning not only for estimating the position, velocity and type of objects that are observed, but also to accurately predict their future motion as this information is available once the time shift has been made.

The synchronized data sets are then fed to a learning engine 310 that is configured to update one or more parameters of a perception model of the perception-development module (i.e. the "bird's eye view CNN") 312 based on the synchronized data sets. In other words, the time-synched bird-eye view and image data and/or LIDAR data is used to train a "new model" 312 to output a bird's eye view of the surrounding environment directly based on image data and/or LIDAR data. Moreover, since the "desired output", i.e. the bird-eye view from the fusion block 304 has undergone a post-processing and quality check procedure, the training data set is likely to be of high quality. Thus, the output from the new model 313 is more likely to be of high quality when it is exposed to this form of training for a long time.

Furthermore, in addition to the local updating/training of the perception model of the perception-development module 312, the updated parameters may be transmitted from the vehicle to a remote entity 2 where they can be manually quality checked and consolidated across an entire fleet of vehicles. Then, a "global" update can be pushed out to each individual vehicle, where the globally updated parameters are used to replace the local model parameters. Moreover, since the data that is being transmitted between the vehicles and the remote entity is in the form of "model parameters" (e.g. network weights) instead of e.g. raw or processed sensor data, advantages in terms of bandwidth requirements, data storage, data security, data privacy, and compliance with data regulations are readily achievable. The "remote entity" 2 or "back-office" 2 may in the present context be understood as a central entity 2 responsible for the management and maintenance of the ADSs deployed in the vehicle fleet.

In other words, training in the fleet vehicles can be done using existing computational resources, running them either in low priority mode or when the vehicle is stationary/charging. The trained model parameters are then merged in the "cloud" and quality checked before the model is updated in the entire fleet. The training can either be focused on specific challenges or as general training to achieve superior performance on e.g. lane tracking in general weather/lighting conditions with lane markings on varying quality.

Figure 4:
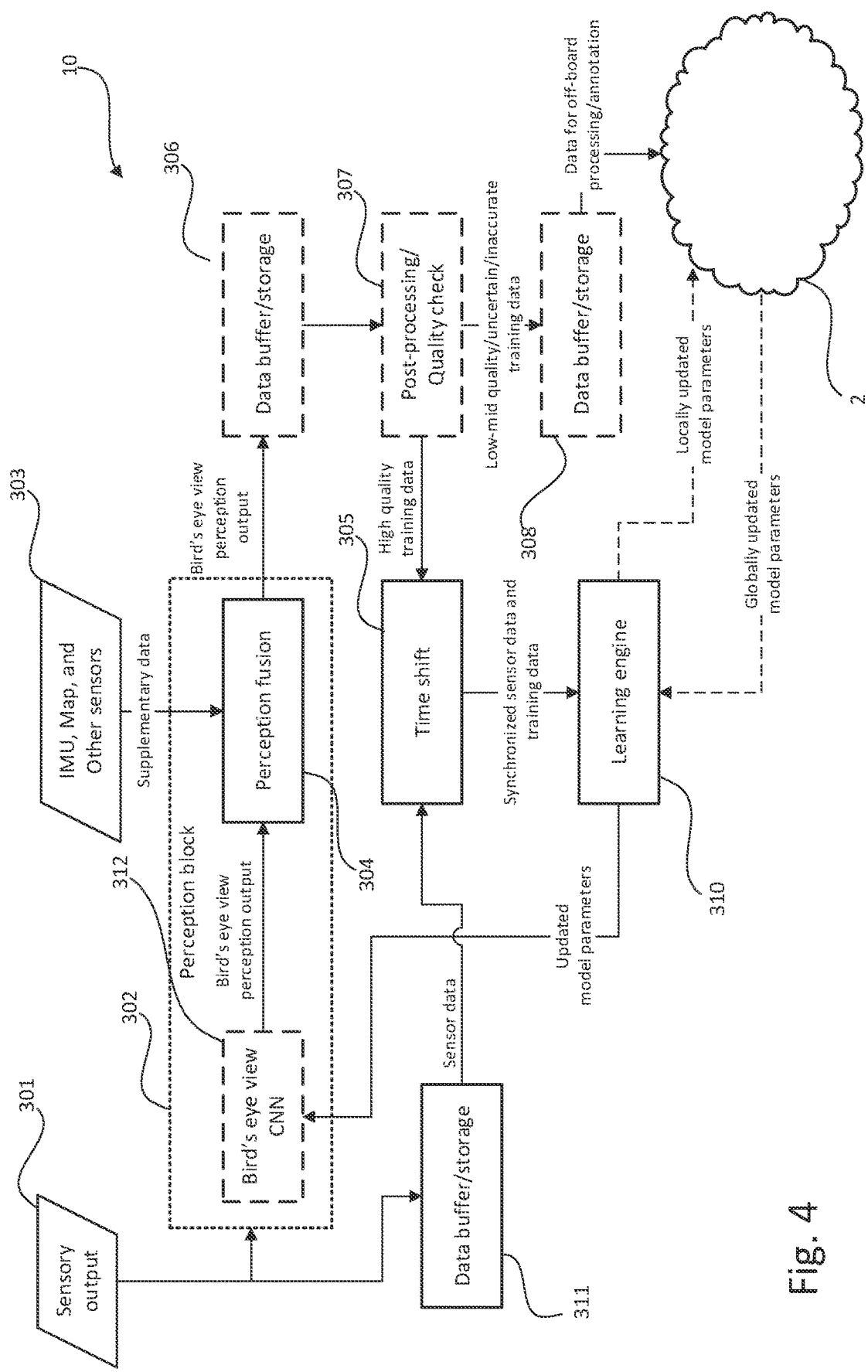
FIG. 4 is a schematic block diagram representation of a system for self-supervised continuous learning of a perception-development module of a vehicle in accordance with an embodiment of the present invention.

Further, turning to FIG. 4 that illustrates a schematic block diagram representation of a system for self-supervised continuous learning of a perception-development module of a vehicle in accordance with an embodiment of the present invention. More specifically, FIG. 4 illustrates an aspect of the invention referred to as the "second stage" in the foregoing, where the "image plane CNN" 313 has been replaced with the now "trained" "bird's eye view CNN" 312 (i.e. the perception-development module).

Accordingly, in continuation from the processes described in reference to FIG. 3, the "image plane CNN" is replaced with the "new" model, preferably once it has been concluded that the new model outperforms the "image plane CNN". The remaining parts of the system and processes are analogous to the ones described in reference to FIG. 3 and will for the sake of brevity and conciseness not be repeated.

However, it should be noted that the two "stages" can be used interchangeably, for example if one wants to add new object types to an object detection and classification algorithm, one can tailor the "original model" (i.e. the image plane CNN) for that purpose and apply the "first stage" training (depicted in FIG. 3) to train the bird's eye view CNN to add the new object type to its feature set.

FIG. 5 depicts a schematic side view of a vehicle 1 comprising a system 10 for self-supervised continuous training of a perception-development module of a vehicle in accordance with an embodiment of the present invention. The vehicle 1 further comprises a perception system 6 or perception block 6, and a localization system 5. A perception system 6 is in the present context to be understood as a system responsible for acquiring raw sensor data from on-board sensors 6a, 6b, 6c such as cameras, LIDARs and RADARs, ultrasonic sensors, and converting this raw data into scene understanding. The localization system 5 is configured to monitor a geographical position and heading of the vehicle, and may in the form of a Global Navigation Satellite System (GNSS), such as a GPS. However, the localization system may alternatively be realized as a Real Time Kinematics (RTK) GPS in order to improve accuracy.

In more detail, the perception system/block 6 may refer to any commonly known system and/or functionality, e.g. comprised in one or more electronic control modules and/or nodes of the vehicle 1, adapted and/or configured to interpret sensory information—relevant for driving of the vehicle 1—to identify e.g. obstacles, vehicle lanes, relevant signage, appropriate navigation paths etc. The exemplified perception system 6 may thus be adapted to rely on and obtain inputs from multiple data sources, such as automotive imaging, image processing, computer vision, and/or in-car networking, etc., in combination with sensory information. Such exemplifying sensory information may for instance be derived from one or more optional surrounding detecting sensors 6a-c comprised in and/or provided on-board the vehicle 1. The surrounding detecting sensors 6a-c may be represented by any arbitrary sensors adapted to sense and/or perceive the vehicle's 1 surroundings and/or whereabouts, and may e.g. refer to one or a combination of one or more of radar, LIDAR, sonar, camera, navigation system e.g. GPS, odometer and/or inertial measurement units.

The system 10 comprises one or more processors 11, a memory 12, a sensor interface 13 and a communication interface 14. The processor(s) 11 may also be referred to as a control circuit 11 or control circuitry 11. The control circuitry 11 is configured to execute instructions stored in the memory 12 to perform a method for performance evaluation of a perception-development module of a vehicle 1 according to any one of the embodiments disclosed herein. Stated differently, the memory 12 of the control device 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices.

The control circuitry 11 is configured to store, during a time period, a first set of sensor data obtained from a first set of vehicle-mounted sensors 6a-6c. The first set of sensor data is accordingly indicative of at least a portion of the surrounding environment of the vehicle. Further, the control circuitry 11 is configured to obtain a first set of perception data from a trained first machine-learning perception module configured to generate a perception output based on sensor data. The first set of perception data is based on the first set of sensor data and furthermore indicative of at least one perceptive parameter in at least a portion of the surrounding environment of the vehicle during the time period.

Furthermore, the control circuitry 11 is configured to form training data based on a second set of perception data obtained from a perception fusion module that is configured to generate a perception output based on a fusion of the first set of perception data and a supplementary set of data. The supplementary set of data is indicative of a surrounding environment of the vehicle and/or a state of the vehicle during the time period. The supplementary set of data may for example be output from an IMU of the vehicle, map data, GNSS data, or other sensor data. The second set of perception data comprises a bird's eye view of a surrounding environment of the vehicle of at least one moment in time during the time period.

The control circuitry 11 is further configured to synchronize the training data with the stored first set of sensor data, and to update one or more parameters of a perception model of the perception-development module based on at least a portion of the synchronized training data and a corresponding portion of the stored first set of sensor data. The perception-development module being configured to generate a bird's eye view of a surrounding environment of the vehicle based on the perception model and sensor data obtained from the first set of vehicle-mounted sensors.

Further, the vehicle 1 may be connected to external network(s) 20 via for instance a wireless link (e.g. for transmitting and receiving model parameters). The same or some other wireless link may be used to communicate with other vehicles in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present invention has been presented above with reference to specific embodiments. However, other embodiments than the above described are possible and within the scope of the invention. Different method steps than those described above, performing the method by hardware or software, may be provided within the scope of the invention. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the system 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 13 may also provide the possibility to acquire sensor data directly or via dedicated sensor control circuitry 6 in the vehicle. The communication/antenna interface 14 may further provide the possibility to send output to a remote location (e.g. remote operator or control centre) by means of the antenna 8. Moreover, some sensors in the vehicle may communicate with the system 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the invention.

Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present invention. Other solutions, uses, objectives, and functions within the scope of the invention as claimed in the below described patent embodiments should be apparent for the person skilled in the art.

The invention claimed is:

1. A method performed by a computing system for self-supervised continuous training of a perception-development module of a vehicle, the method comprising:
    storing, during a time period, a first set of sensor data obtained from a first set of vehicle-mounted sensors, the first set of sensor data being indicative of a surrounding environment of the vehicle;
    obtaining a first set of perception data from a trained machine-learning perception module configured to generate a perception output based on sensor data, the first set of perception data being based on the first set of sensor data and indicative of at least one perceptive parameter in the surrounding environment of the vehicle during the time period;
    forming training data based on a second set of perception data obtained from a perception fusion module configured to generate a perception output based on a fusion of the first set of perception data and a supplementary set of data,
    wherein the supplementary set of data is indicative of a surrounding environment of the vehicle and a state of the vehicle during the time period, and
    wherein the second set of perception data comprises a bird's eye view of a surrounding environment of the vehicle of at least one moment in time during the time period;
    synchronizing the training data with the stored first set of sensor data; and
    updating one or more parameters of a perception model of the perception-development module based on at least a portion of the synchronized training data and a corresponding portion of the stored first set of sensor data, the perception-development module being configured to generate a bird's eye view of a surrounding environment of the vehicle based on the perception model and sensor data obtained from the first set of vehicle-mounted sensors.

2. The method according to claim 1, wherein the step of updating one or more parameters of the perception model of the perception-development module comprises:
updating one or more parameters of the perception model of the perception-development module by means of a learning algorithm based on at least a portion of the stored first set of sensor data and by using a corresponding portion of the synchronized training data as a supervisory signal.

3. The method according to claim 1, wherein the second set of perception data further comprises a confidence estimation of a plurality of perceptive parameters comprised in the bird's eye view of a surrounding environment of the vehicle during the time period,
wherein the synchronization of the training data with the stored first set of sensor data is only performed for training data having a confidence estimation above a threshold.

4. The method according to claim 3, further comprising:
transmitting the formed training data and the stored sensor data to a remote entity if the training data has a confidence estimation below the threshold.

5. The method according to claim 1, wherein the step of forming the training data further comprises:
post-processing the second set of perception data in order to curate the second set of perception data.

6. The method according to claim 5, and wherein the time period ranges from a first time point to a second time point, the method further comprising:
storing, during the time period, the second set of perception data,
wherein the step of post-processing the second set of perception data comprises:
determining, based on post processing a portion of the second set of perception data ranging back from the second time point to an intermediate time point between the first and second time points, the training data indicative of a bird's eye view of the surrounding environment of the vehicle conditional on the portion of the second set of perception data.

7. The method according to claim 6, wherein the post processing of the portion of the second set of perception data further comprises:
running the portion of the second set of perception data through a backwards filter configured to align a set of perceptive parameters of the second set of perception data at the intermediate time point based on a development of the state(s) of the set of perceptive parameters from the intermediate time point to the second time point.

8. The method according to claim 1, wherein the trained machine-learning perception module is configured to generate a perception output in an image plane comprising detections and classifications of objects based on sensor data obtained from the first set of vehicle-mounted sensors.

9. The method according to claim 1, wherein the trained machine-learning perception module is the perception-development module that is configured to generate a bird's eye view of a surrounding environment of the vehicle based on sensor data obtained from the first set of vehicle-mounted sensors.

10. The method according to claim 1, further comprising:
transmitting the one or more updated parameters of the perception model of the perception-development module to a remote entity;
receiving a set of globally updated parameters of the perception model of the perception-development module from the remote entity, wherein the set of globally updated parameters are based on information obtained from a plurality of vehicles comprising the perception-development module; and
updating the perception model of the perception-development module based on the received set of globally updated parameters.

11. A non-transitory computer-readable storage medium storing one or more instructions configured to be executed by one or more s of a processing system, the one or more instructions for performing the method according to claim 1.

12. A system for self-supervised continuous training of a perception-development module of a vehicle, the system comprising control circuitry configured to:
store, during a time period, a first set of sensor data obtained from a first set of vehicle-mounted sensors, the first set of sensor data being indicative of a surrounding environment of the vehicle;
obtain a first set of perception data from a trained first machine-learning perception module configured to generate a perception output based on sensor data, the first set of perception data being based on the first set of sensor data and indicative of at least one perceptive parameter in the surrounding environment of the vehicle during the time period;
form training data based on a second set of perception data obtained from a perception fusion module configured to generate a perception output based on a fusion of the first set of perception data and a supplementary set of data;
wherein the supplementary set of data is indicative of a surrounding environment of the vehicle and/or a state of the vehicle during the time period, and
wherein the second set of perception data comprises a bird's eye view of a surrounding environment of the vehicle of at least one moment in time during the time period;
synchronize the training data with the stored first set of sensor data; and
update one or more parameters of a perception model of the perception-development module based on at least a portion of the synchronized training data and a corresponding portion of the stored first set of sensor data, the perception-development module being configured to generate a bird's eye view of a surrounding environment of the vehicle based on the perception model and sensor data obtained from the first set of vehicle-mounted sensors.

13. A vehicle comprising:
a set of vehicle-mounted sensors configured to output sensor data indicative of a surrounding environment of the vehicle;
a trained first machine-learning perception module configured to generate a perception output based on sensor data;
an automated driving system, ADS, having a perception module configured to generate a perception output based on a fusion of the first set of perception data and a supplementary set of data, wherein the supplementary set of data is indicative of a surrounding environment of the vehicle and/or a state of the vehicle; and a system for self-supervised continuous training of a perception-development module of the vehicle, the system comprising control circuitry configured to:

store, during a time period, a first set of sensor data obtained from a first set of vehicle-mounted sensors, the first set of sensor data being indicative of the surrounding environment of the vehicle;

obtain a first set of perception data from a trained first machine-learning perception module configured to generate a perception output based on sensor data, the first set of perception data being based on the first set of sensor data and indicative of at least one perceptive parameter in the surrounding environment of the vehicle during the time period;

form training data based on a second set of perception data obtained from a perception fusion module configured to generate a perception output based on a fusion of the first set of perception data and a supplementary set of data;

wherein the supplementary set of data is indicative of a surrounding environment of the vehicle and/or a state of the vehicle during the time period, and wherein the second set of perception data comprises a bird's eye view of a surrounding environment of the vehicle of at least one moment in time during the time period;

synchronize the training data with the stored first set of sensor data; and update one or more parameters of a perception model of the perception-development module based on at least a portion of the synchronized training data and a corresponding portion of the stored first set of sensor data, the perception-development module being configured to generate a bird's eye view of a surrounding environment of the vehicle based on the perception model and sensor data obtained from the first set of vehicle-mounted sensors.

* * * * *